United States Patent
Bielesch et al.

(10) Patent No.: US 10,523,069 B2
(45) Date of Patent: Dec. 31, 2019

(54) BEARING ASSEMBLY OF A MOTOR SHAFT OF AN ELECTRIC MOTOR

(71) Applicant: MAHLE International GmbH, Stuttgart (DE)

(72) Inventors: Thomas Bielesch, Muehlacker (DE); Jochen Sammet, Kornwestheim (DE)

(73) Assignee: MAHLE International GmbH, Stuttgart (DE)

( * ) Notice: Subject to any disclaimer, the term of this patent is extended or adjusted under 35 U.S.C. 154(b) by 0 days.

(21) Appl. No.: 16/148,345

(22) Filed: Oct. 1, 2018

(65) Prior Publication Data

US 2019/0036394 A1 Jan. 31, 2019

Related U.S. Application Data

(63) Continuation of application No. PCT/EP2017/056316, filed on Mar. 16, 2017.

(30) Foreign Application Priority Data

Mar. 30, 2016 (DE) .................. 10 2016 205 252

(51) Int. Cl.
*H02K 5/15* (2006.01)
*H02K 1/20* (2006.01)
(Continued)

(52) U.S. Cl.
CPC ................ *H02K 1/20* (2013.01); *F16C 19/08* (2013.01); *H02K 1/16* (2013.01); *H02K 1/187* (2013.01);
(Continued)

(58) Field of Classification Search
CPC ......... H02K 1/187; H02K 5/15; H02K 5/1732
See application file for complete search history.

(56) References Cited

U.S. PATENT DOCUMENTS 2,462,204 A * 2/1949 Ludwig ............. H02K 5/15
  310/405
3,894,256 A * 7/1975 Sholtz .............. H02K 5/167
  310/90

(Continued)

FOREIGN PATENT DOCUMENTS

CN 1356758 A 7/2002
CN 205105021 U 3/2016
(Continued)

OTHER PUBLICATIONS

International Search Report dated Jul. 7, 2017 in corresponding application PCT/EP2017/056316.

*Primary Examiner* — Dang D Le
(74) *Attorney, Agent, or Firm* — Muncy, Geissler, Olds & Lowe, P.C.

(57) ABSTRACT

A bearing assembly for a motor shaft of an electric motor having a stator. The stator is formed by a stator core having a plurality of stator laminations, which are stacked one on the other. The stator core has a first outer partial stator core, a second outer partial stator core, and a central partial stator core. The central partial stator core is arranged between the two outer partial stator cores. A continuous opening is arranged in each of the partial stator cores, in which openings bearings for supporting the motor shaft are arranged and the motor shaft is arranged. A diameter of the opening of the central partial stator core is smaller than a diameter of the opening of the outer partial stator cores such that a diameter transition from the central partial stator core to an outer partial stator core forms an axial stop for a bearing.

25 Claims, 4 Drawing Sheets

(51) Int. Cl.
*H02K 5/173* (2006.01)
*H02K 1/18* (2006.01)
*F16C 19/08* (2006.01)
*H02K 1/16* (2006.01)
*H02K 5/16* (2006.01)
*H02K 7/08* (2006.01)

(52) U.S. Cl.
CPC ........... *H02K 5/163* (2013.01); *H02K 5/1735* (2013.01); *H02K 7/085* (2013.01); *F16C 2380/26* (2013.01); *H02K 2205/09* (2013.01)

(56) References Cited

U.S. PATENT DOCUMENTS

| | | | | |
|---|---|---|---|---|
| 4,031,610 A | * | 6/1977 | Singh | ............... H02K 15/16 29/596 |
| 5,068,556 A | * | 11/1991 | Lykes | ............... H02K 5/15 310/89 |
| 5,633,543 A | * | 5/1997 | Jarczynski | ............... H02K 1/20 310/59 |
| 5,825,108 A | * | 10/1998 | De Filippis | ............ H02K 21/22 310/67 R |
| 6,703,738 B2 | | 3/2004 | Yoshikawa et al. | |
| 7,057,318 B2 | * | 6/2006 | Strobl | ............... F02M 37/08 310/89 |
| 7,586,228 B2 | * | 9/2009 | Best | ............... H02K 1/187 310/67 R |
| 7,676,880 B2 | | 3/2010 | Moein et al. | |
| 2014/0028125 A1 | | 1/2014 | Arai | |

FOREIGN PATENT DOCUMENTS

| | | |
|---|---|---|
| DE | 200 21 796 U1 | 6/2002 |
| GB | 2495711 A | 4/2013 |
| JP | H08186969 A | 7/1996 |

* cited by examiner

BEARING ASSEMBLY OF A MOTOR SHAFT OF AN ELECTRIC MOTOR

This nonprovisional application is a continuation of International Application No. PCT/EP2017/056316, which was filed on Mar. 16, 2017, and which claims priority to German Patent Application No. 10 2016 205 252.7, which was filed in Germany on Mar. 30, 2016, and which are both herein incorporated by reference.

BACKGROUND OF THE INVENTION

Field of the Invention

The present invention relates to a bearing assembly for a motor shaft of an electric motor, in particular an electric motor for a fan of a heat exchanger or for a blower of an air-conditioning system, in particular of a motor vehicle.

Description of the Background Art

Known electric motors have a stator made up of a laminated core, around which a winding is usually disposed. In addition, a central opening, through which the motor shaft of the electric motor protrudes, is provided in the stator. The motor shaft is also usually supported in such a way that it is able to continuously carry out the rotational movements in a stable position.

DE 200 21 796 U1 discloses an electric motor having a stator which is formed from a laminated core. In this laminated core, a centrally disposed, through-engaging opening, with which a sleeve engages, is disposed in this laminated core. The bearings for supporting the motor shaft are disposed as a bearing tube in this sleeve, but outside the laminated core.

This has the disadvantage that although the bearing tube is held in the laminated core, the bearing is only slightly supported by the bearing tube in the radial direction, and a relatively large number of parts are additionally needed to mount the bearing assembly.

SUMMARY OF THE INVENTION

It is therefore an object of the present invention to provide a bearing assembly for a shaft of an electric motor, which has a simple structure and permits a good and secure support of the motor shaft, while being easy to mount. The object is also to provide an electric motor, including a bearing assembly, which is easy to mount and permits a secure support of the motor shaft.

An exemplary embodiment of the invention relates to a bearing assembly for a shaft of an electric motor, including a stator, the stator being formed from a stator core having a large number of stator elements which are stacked one on top of the other, the stator core comprising a first outer partial stator core and a second outer partial stator core and a central partial stator core, the central partial stator core being disposed between the two outer partial stator cores, a continuous opening being disposed in the partial stator cores, in which bearings for supporting the motor shaft and the motor shaft are accommodated, a diameter of the opening of the central partial stator core being smaller than a diameter of the opening of each of the outer partial stator cores, so that a diameter transition from the central partial stator core to an outer partial stator core forms an axial stop for a bearing in each case, a bearing being disposed in each case in the particular opening of the particular outer partial stator core. In each case, a stop for one of the bearings is formed thereby, so that the positioning of the bearings and thus also the rotor shaft may be easily fixed, while the stator core may be easily formed and mounted. The stator elements are also preferably designed as stator laminations.

It is also advantageous if the first outer partial stator core, the central partial stator core and the second outer partial stator core are stacked one on top of the other and are connected to each other. The stator core is thus formed into a monolithic element thereby, which securely holds the bearings and this also the motor shaft.

The stator core can have a first circumferential wall disposed radially outside the centrally disposed opening. This wall can be used to radially hold the bearings.

The stator core can have a second circumferential wall radially outside the first circumferential wall, connecting webs being disposed between the first circumferential wall and the second circumferential wall. This second circumferential wall is used, on the one hand, to stabilize the stator core, while nevertheless permitting channels between the two circumferential walls, which serves to cool the stator during a through-flow.

The stator core can have radially outwardly protruding webs radially outside the second circumferential wall. These webs are used to accommodate a winding, to conduct the magnetic field, and they are also indirectly used for cooling purposes.

The two disposed bearings can be situated at a distance from each other in such a way that a cavity is formed in the central partial stator core between the bearings in the axial direction. This cavity is formed by the distance between the bearings with the provided diameter of the opening in the central partial stator core. This makes it possible to save material and mass.

At least one channel can be provided in the stator core, for example, if multiple channels are provided, which connects or connect the cavity to the outer chamber. This channel is advantageous so that any water that may have collected in the cavity may be removed or is able to flow off. Such water entering the cavity is unavoidable for applications in air conditioning systems or as a drive for a fan or for a blower, which is why the water must, however, be advantageously removed to avoid damage.

The channel or at least one of the channels or all channels can be introduced into the stator elements which form the stator core. As a result, no additional components are needed to form these channels.

The channel or at least one of the channels or all channels can be introduced into at least one of the stator elements by means of sheet metal cutting, sheet metal embossing or the like. This may be already advantageously integrated into the manufacturing process of the stator elements, which simplifies the manufacture.

The channel or at least one of the channels or all channels in the stator core can be oriented in the axial direction and/or in the radial direction and/or in the circumferential direction.

At least one of the channels or a plurality of channels can be oriented in the axial direction or if at least one of the channels or a plurality of channels is or are oriented in the radial direction. An automatic drainage may be achieved by the design and orientation of the channels.

The particular bearing can be pressed into the openings of the particular outer partial stator core. A more secure hold is achieved thereby.

The two outer partial stator cores can be provided with the same design and the inner partial stator core is provided with a different design therefrom. This makes the manufacture and the parts logistics easier.

The motor shaft can be inserted, for example pressed, into the two bearings. A secure and defined positioning is achieved thereby.

The bearing assembly can be refined in such a way that at least one first cover is provided, which at least partially covers at least a first bearing and the first outer partial stator core (6). The bearing covered by the first cover may be better protected against water thereby.

At least one second cover can be provided, which at least partially covers one bearing and the second outer partial stator core. The second cover may be provided with or without the first cover. The second cover is used to better protect the bearing covered thereby against water.

At least one radial shaft sealing ring can be provided, which is disposed in a recess of the first cover and/or the second cover and is or are provided in a sealing manner between the particular cover and the motor shaft.

The corresponding bearing, which can be disposed on the side where the motor shaft protrudes, may be protected against water thereby. Due to the radial shaft sealing ring, a seal may be provided between the shaft and the particular cover for the purpose of preferably keeping water away from the bearing.

The first cover and/or the second cover can overlap the first circumferential wall. As a result, water is unable to have a corrosive effect directly in the area of the bearing at the cover, but instead the particular cover shields the particular bearing over a wider area.

The first cover and/or the second cover can engage with at least one opening or with multiple openings which is or are disposed radially outside the first circumferential wall and/or between the first circumferential wall and the second circumferential wall. As a result, the first and/or second cover surrounds or surround the central area of the bearing assembly, possibly in an encapsulating manner, and preferably completely encompass(es) and seal(s) this area.

The first cover and/or the second cover can be connected to the stator core in a form-fitting manner. As a result, the sealing action is permanently ensured.

At least one fastener can be provided on the first cover and/or on the second cover, with the aid of which the cover or covers is or are connected to the stator core in a form-fitting manner. Fasteners of this type may be, for example, pins, connecting webs or clips or the like, which are used to connect the cover or covers to each other and/or to the stator core.

At least one fastening element is provided on one of the covers, with the aid of which the bearing assembly may be fastened to an external component. The fastening element is preferably a fastening flange.

It is also advantageous if at least one fastening element is provided on one of the covers, which forms a receiving chamber for a control unit for an electric motor. The fastening element may be, for example, a housing or a housing part, which accommodates, for example, the control unit of an electric motor.

An exemplary embodiment of the invention also relates to an electric motor comprising a stator and a rotor, a bearing assembly according to an inventive design being formed in the stator.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
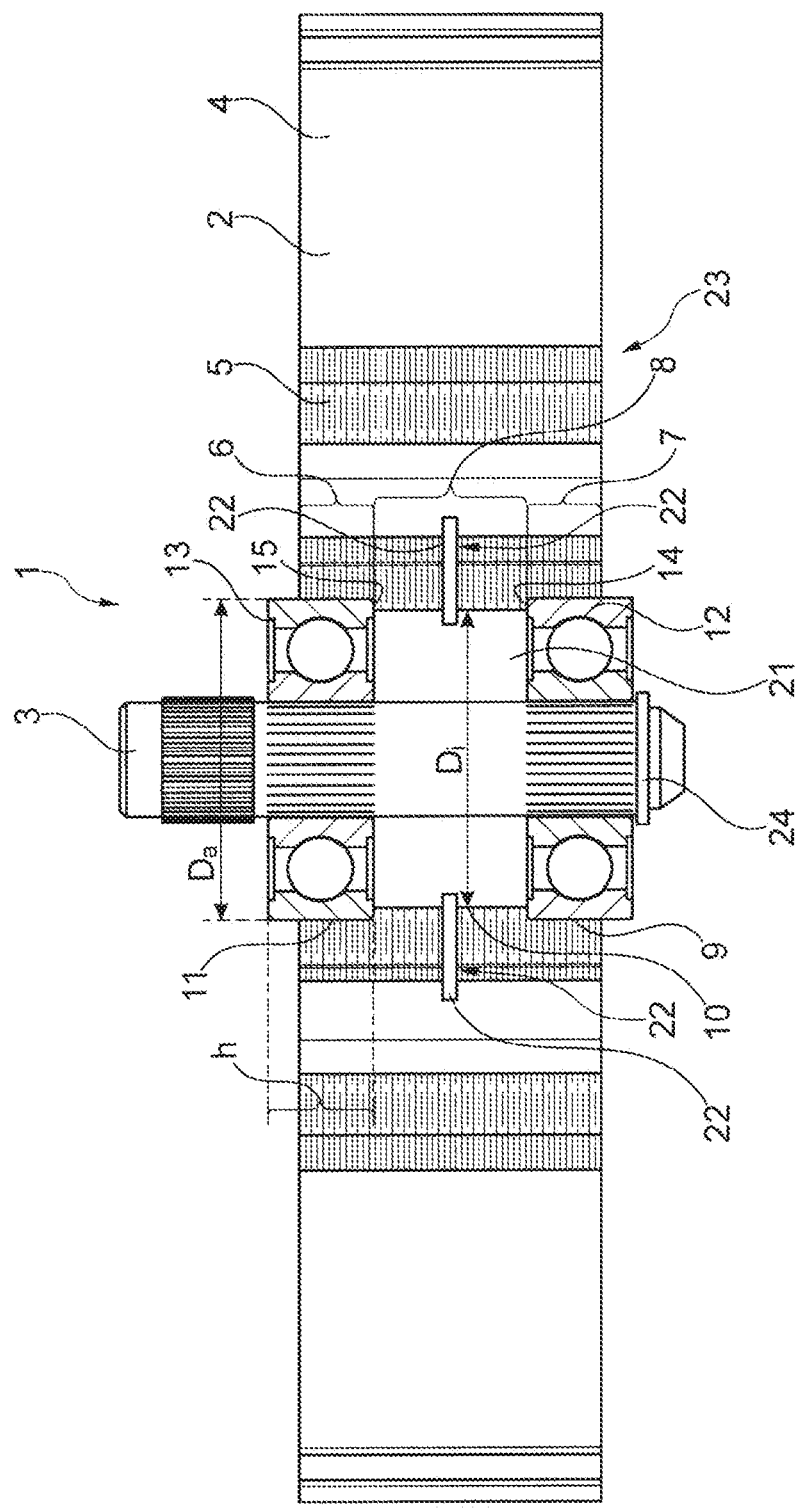
FIG. 1 shows a sectional view of a bearing assembly in a stator of an electric motor.
Figure 2:
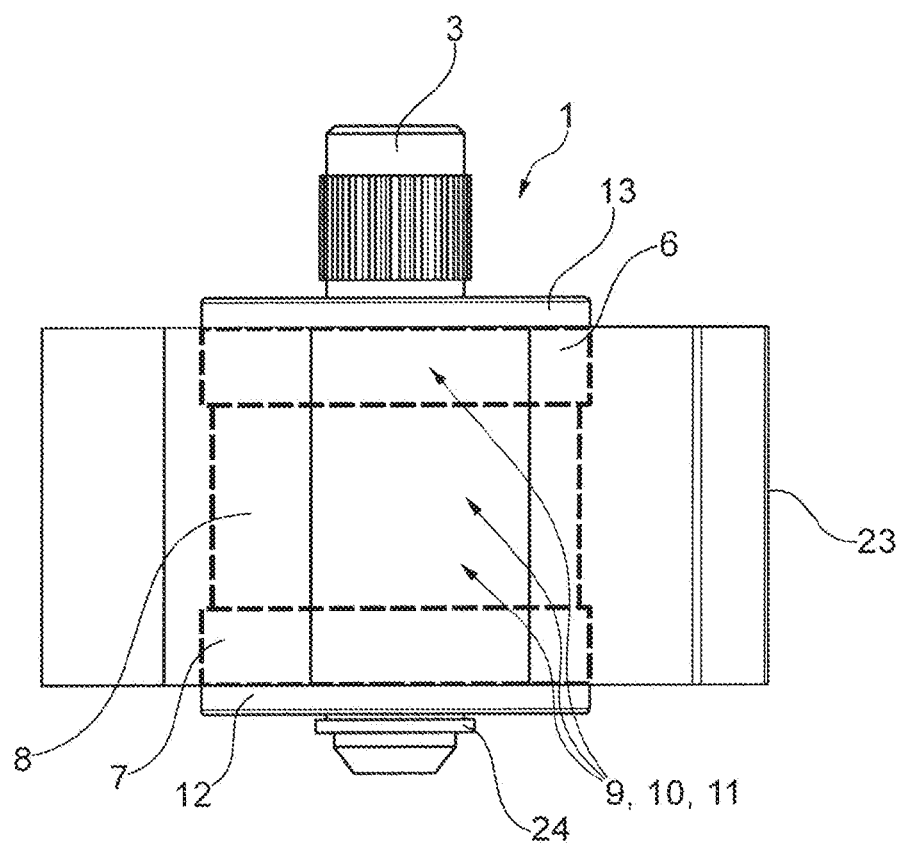
FIG. 2 shows another view of the bearing assembly.
Figure 3:
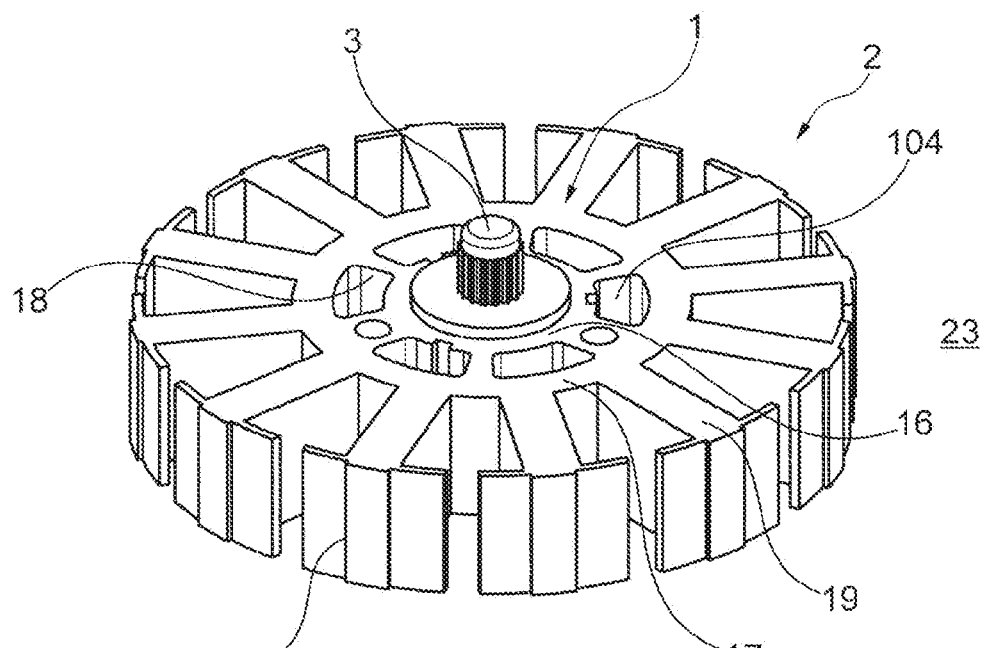
FIG. 3 shows a perspective representation of the stator.

FIG. 1 shows a sectional view of a bearing assembly 1 in a stator 2 of an electric motor, FIG. 2 showing an alternative view. FIG. 3 shows a perspective representation of stator 2 itself for the sake of better understanding.

Bearing assembly 1 is a bearing assembly 1 for a motor shaft 3 of an electric motor. The electric motor comprises a stator 2 and a rotor.

Stator 2 has a stator core 4, which is made up of stator elements 5 stacked one on top of the other. These elements are preferably designed as stator laminations, which are stacked one on top of the other. Stator 2 is preferably made up of a large number of stator elements 5, which are stacked one on top of the other.

Stator 2 or stator core 4 is designed in such a way that it includes a first outer partial stator core 6 and a second outer partial stator core 7 and a central partial stator core 8, which are stacked one on top of the other. Partial stator cores 6, 7 and 8, in turn, are made up of stator elements 5.

Central partial stator core 8 is disposed between the two outer partial stator cores 6, 7, as is apparent in FIG. 1.

A continuous opening 9, 10, 11, in which bearings 12, 13 for supporting motor shaft 3 are arranged, is disposed in each of partial stator cores 6, 7, 8. Motor shaft 3 is also disposed in bearings 12, 13 in openings 9, 10, 11. Motor shaft 3 is preferably inserted, for example pressed, into the two bearings 12, 13.

Openings 9, 10, 11 have different diameters $D_a$, $D_i$. Diameter $D_a$ of openings 9, 11 of outer partial stator cores 6, 7 is at least slightly larger than diameter $D_i$ of opening 10 of central partial stator core 8. As a result, particular stator elements 5 of central partial stator core 8 form stops 14, 15 for positioning bearings 12, 13 in outer partial stator cores 6, 7.

Diameter $D_i$ of opening 10 of central partial stator core 8 is thus smaller than a diameter $D_a$ of each of openings 9, 11 of outer partial stator cores 6, 7. The diameter transition from central partial stator core 8 to an outer partial stator core 6, 7 thus forms an axial stop 14, 15 for a bearing 12, 13 in each case, so that particular bearing 12, 13 may be pushed into particular opening 9, 11 up to stop 14, 15 in the axial direction. Correspondingly, in each case, a bearing 12, 13 is disposed in particular opening 9, 11 of particular outer partial stator core 6, 7. Stops 14, 15 are used as a bearing seat for bearings 12, 13.

First outer partial stator core 6, central partial stator core 8 and second outer partial stator core 7 are stacked one on top of the other and connected to each other. Partial stator cores 6, 7, 8 are preferably premounted and subsequently connected to each other, outer partial stator cores 6, 7 optionally being identical parts. The two outer partial stator cores 6, 7 thus preferably have the same design, inner partial stator core 8, conversely, having a different design. This optional embodiment of outer partial stator cores 6, 7 reduces the part complexity, which also lowers costs.

To dispose bearings 12, 13 in openings 9, 11, it is also advantageous if the latter are pressed into openings 9, 11 of particular outer partial stator core 6, 7. How far into openings 9, 11 bearings 12, 13 engage depends on the material thickness of partial stator cores 6, 7 compared to height h of bearings 12, 13. It is apparent in FIGS. 1 and 2 that bearings 12, 13 protrude slightly out of openings 9, 11. The insertion depth of bearings 12, 13 is therefore determined by height h of partial stator cores 6, 7.

It is apparent in FIG. 3 that stator core 4 has a first circumferential wall 16 radially outside centrally disposed opening 9, 10, 11.

This wall 16 is used to arrange bearings 12, 13. Stator core 4 has a second circumferential wall 17 radially outside first circumferential wall 16, connecting webs 18 being disposed between first circumferential wall 16 and second circumferential wall 17. These connecting webs optionally run radially. It is also apparent in FIG. 3 that stator core 4 has radially outwardly protruding webs 19 radially outside second circumferential wall 17. These webs 19 are designed to be connected radially on the outside to elements 20 running in the circumferential direction. Elements 20 form a circumferential, segmented wall, which is interrupted multiple times.

It is also apparent in FIG. 1 that the two arranged bearings 12, 13 are situated at a distance from each other in such a way that a cavity 21 is formed in the radial direction between bearings 12, 13 in opening 10 of central partial stator core 8. Cavity 21 is delimited at the top and bottom by bearings 12, 13. Cavity 21 is delimited radially on the inside by the shaft and cavity 21 is delimited radially on the outside by the central partial stator core. Water may possibly enter this cavity 21 during the operation of the electric motor.

To permit a drainage of cavity 21, at least one channel 22 is provided in stator core 4, preferably multiple channels 22 are provided, which connects or connect cavity 21 to outer chamber 23.

It is particularly advantageous if channel 22 or at least one of channels 22 or all channels 22 is/are introduced into stator elements 5, which form stator core 4. This avoids using bearings 12, 13 for the outflow of water or the water not being able to exit. Channel 22 or at least one of channels 22 or all channels 22 may be introduced into at least one of stator elements 5 by means of sheet metal cutting, sheet metal embossing or the like. This method is preferred because it may be integrated into the manufacturing method of stator elements 5, such as the stator laminations.

It is advantageous if channel 22 or at least one of channels 22 or all channels 22 in stator core 4 is/are oriented in the axial direction and/or in the radial direction and/or in the circumferential direction. It is also advantageous if at least one of channels 22 or a plurality of channels 22 is or are oriented in the axial direction or if at least one of channels 22 or a plurality of channels 22 is or are oriented in the radial direction. FIG. 1 shows that channels 22 are oriented in the radial direction.

The bearing assembly illustrated in FIGS. 1 through 3 is preferably part of an electric motor, which comprises a stator and a rotor. The motor is, for example, a DC motor or a BLDC electric motor.

Partial stator cores 6, 7, 8 are manufactured separately from each other during manufacture and are then joined together and connected to each other in a subsequent production step. A winding may then be mounted.

It is furthermore apparent in FIG. 1 that motor shaft 3 is pushed into bearings 12, 13 from above all the way to the stop and is secured on the opposite side, i.e. at the bottom, with the aid of a securing ring 24 so that motor shaft 3 is unable to slip out of bearings 12, 13. As a result, motor shaft 3 has only a slight vertical axial clearance, which is determined by the axial clearance of bearings 12, 13.

Figure 4:
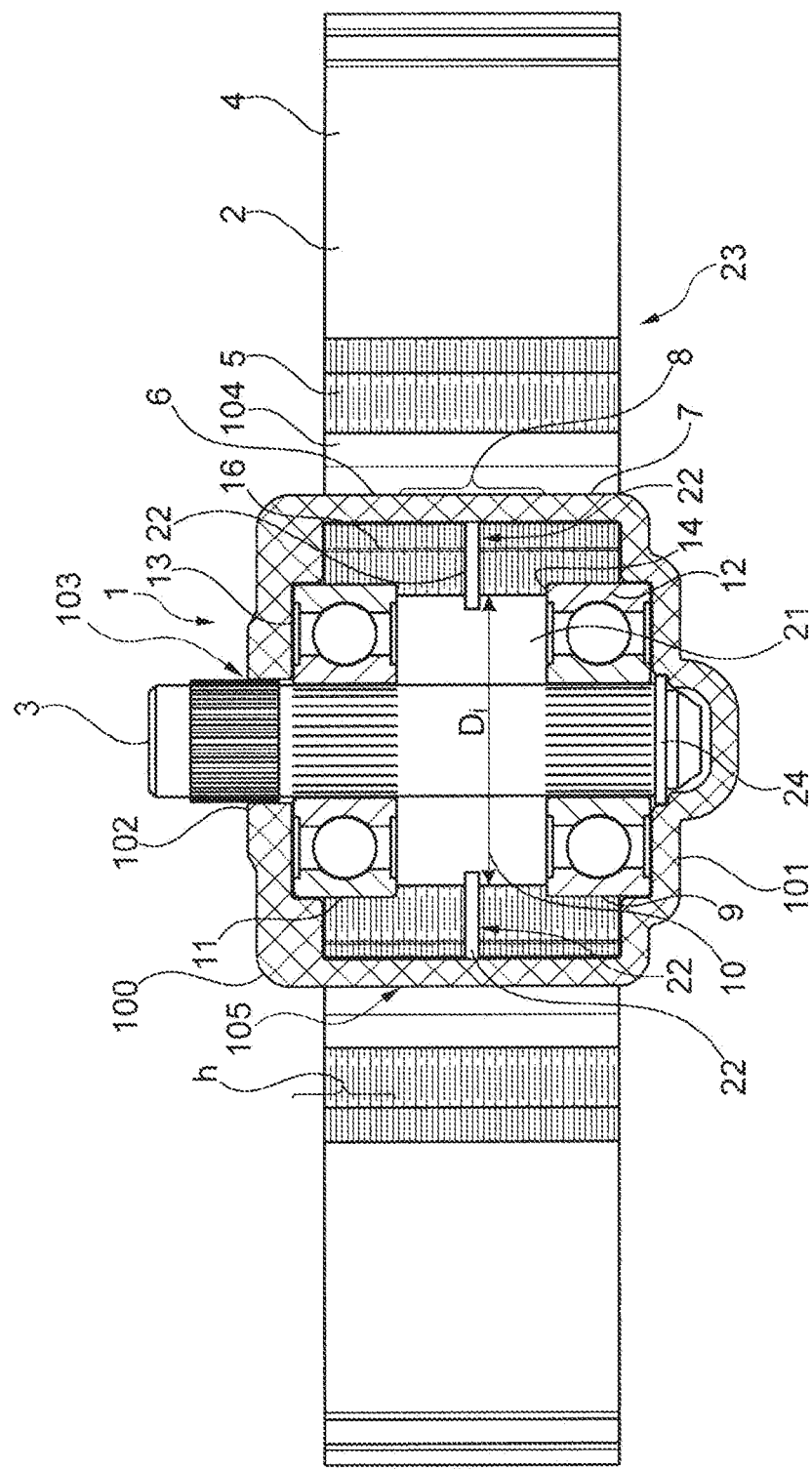
FIG. 4 shows a sectional view of an alternative bearing assembly in a stator of an electric motor.
Figure 5:
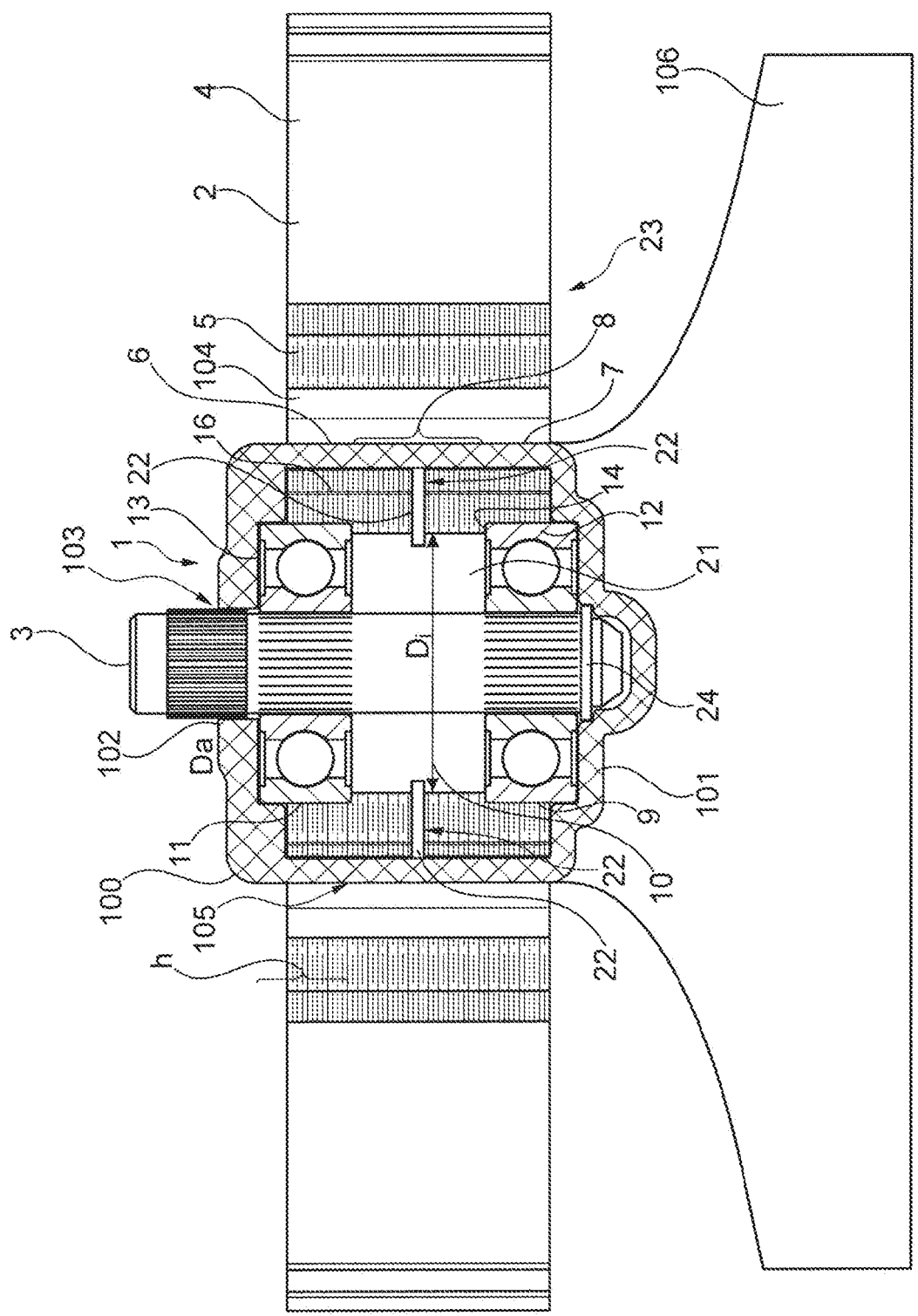
FIG. 5 shows a sectional view of another bearing assembly in a stator of an electric motor.

FIGS. 4 and 5 each show another sectional view of an alternative bearing assembly 1 in a stator 2 of an electric motor, the alternative bearing assemblies in FIGS. 4 and 5 building upon bearing assembly 1 in FIG. 1 and each having additional covers for protection against water. Accordingly, reference is hereby made essentially entirely to the description of bearing assembly 1 described above.

To protect bearings 12, 13, bearing assembly 1 in FIGS. 4 and 5 has at least one first cover 100, which at least partially covers bearing 13 and first outer partial stator core 6. First cover 100 protects bearing 13 against water.

Alternatively or additionally, a second cover 101 is provided, which at least partially covers bearing 12 and second outer partial stator core 7.

In the area of motor shaft 3, at least cover 100 has a central recess 102, such as an opening, at least one radial shaft sealing ring 103 being provided, which is disposed in recess 102 of first cover 100 and is accommodated in a sealing manner between first cover 100 and motor shaft 3. FIG. 4 and FIG. 5, respectively, show only one radial shaft sealing ring in a recess of cover 100. Alternatively or additionally, a recess and a radial shaft sealing ring may also be provided in second cover 101 between the second cover and the motor shaft.

FIGS. 4 and 5 also show that first cover 100 and second cover 101 overlap first circumferential wall 16. Alternatively only first cover 100 or only second cover 101 may overlap first circumferential wall 16. First cover 100 and second cover 101 engage with at least one opening 104 or with multiple openings 104, which is or are disposed radially outside first circumferential wall 16 and/or between first circumferential wall 16 and second circumferential wall 17. Alternatively, only first cover 100 or only second cover 101 may engage with the at least one opening 104 or with multiple openings 104.

It is particularly advantageous if first cover 100 and/or second cover 101 is or are connected to stator core 4 in a form-fitting manner. The form-fitting connection may take place in that first cover 100 or second cover 101 is connected directly to stator core 4 or that first cover 100 is connected to second cover 101 and stator core 4 is encompassed by covers 100, 101 thereby, so that covers 100, 101 are indirectly connected to the stator core.

For fastening purposes, fastener(s) 105 is or are preferably provided on first cover 100 and/or on second cover 101, with the aid of which cover or covers 100, 101 is or are connected to stator core 4 in a form-fitting manner. Fastener 105 may be designed as a pin, connecting webs or the like for the purpose of fastening stator core 4 or the one cover 100, 101 to the other cover 101, 100. The one cover 100, 101 may thus protrude through the stator core, in particular through openings 104, where it may be connected to the particular other cover 101, 100. Fastener 105 of this type are preferably fastened to particular cover 100, 101 by means of injection molding or form a single piece therewith or are molded thereon. The connection between fastener 105 and the particular cover may also take place by means of ultrasonic welding. In particular, fastener 105 may be injection-molded onto the one cover 100, 101 and be connected to the other cover 101, 100 with the aid of ultrasonic welding.

It is advantageous if one of covers 100, 101 or both covers 100, 101 are made from plastic. It is advantageous if fasteners 105 are also made from plastic.

FIGS. 4 and 5 show that first cover 100 abuts the outer race of bearing 13. Second cover 101 also abuts the outer race of second bearing 12. As a result, the particular cover is designed or disposed to be rotationally fixed with respect to stator core 4.

If channels 22, such as water drainage bores, are provided in stator core 4, they advantageously run between fastener 105, such as pins, connecting webs or the like.

FIG. 5 shows that at least one fastening element 106, such as a flange, is provided on one of covers 101, with the aid of which the bearing assembly may be fastened to an external component.

Alternatively or additionally, at least one fastening element 106 may be provided on one of covers 100, 101, which forms a receiving chamber for a control unit for the electric motor.

FIG. 5 shows that cover 101, together with fastening element 106, is guided into or through stator core 4 from below.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A bearing assembly for a motor shaft of an electric motor, the bearing assembly comprising:
a stator formed from a stator core made up of a plurality of stator elements that are stacked one on top of the other, the stator core having a first outer partial stator core, a second outer partial stator core and a central partial stator core, the central partial stator core being disposed between the first and second outer partial stator cores; and
a continuous opening disposed in the first, second and central partial stator cores, in which bearings for supporting the motor shaft are provided and in which the motor shaft is accommodated, the continuous opening extending through a center of each of the first, second and central partial stator cores, a central axis of the continuous opening being aligned with an axis of the motor shaft,
wherein the continuous opening includes an opening in the first outer partial stator core, an opening in the second outer partial stator core and an opening in the central partial stator core,
wherein the central partial stator core extends radially inwards toward the motor shaft to a greater extent than the first outer partial stator core and the second outer partial stator core, such that a diameter of the opening of the central partial stator core is smaller than a diameter of each of the opening of the first outer partial stator core and the second outer partial stator core, so that a diameter transition from the central partial stator core to the first outer partial stator core is stepped to form a first axial stop for one of the bearings and a diameter transition from the central partial stator core to the second outer partial stator core is stepped to form a second axial stop for a second one of the bearings, the one of the bearings being disposed directly in the opening of the first outer partial stator core and the second one of the bearings being disposed directly in the opening of the second outer partial stator core.

2. The bearing assembly according to claim 1, wherein the first outer partial stator core, the central partial stator core, and the second outer partial stator core are stacked one on top of the other and are connected to each other.

3. The bearing assembly according to claim 1, wherein the stator core has a first circumferential wall disposed radially outside the continuous opening.

4. The bearing assembly according to claim 3, wherein the stator core has a second circumferential wall disposed radially outside the first circumferential wall, and wherein connecting webs are disposed between the first circumferential wall and the second circumferential wall.

5. The bearing assembly according to claim 4, wherein the stator core has radially outwardly protruding webs disposed radially outside the second circumferential wall.

6. The bearing assembly according to claim 1, wherein the bearings are situated at a distance from each other such that a cavity is formed in the axial direction between the bearings in the opening of the central partial stator core.

7. The bearing assembly according to claim 6, wherein at least one channel is provided in the stator core to connect the cavity to an outer chamber or wherein a plurality of channels are provided to connect the cavity to the outer chamber.

8. The bearing assembly according to claim 7, wherein the at least one channel or at least one of the plurality of channels are introduced into the stator elements, which form the stator core.

9. The bearing assembly according to claim 8, wherein the at least one channel or the at least one of the plurality of channels are introduced into at least one of the stator elements via sheet metal cutting or sheet metal embossing.

10. The bearing assembly according to claim 8, wherein the at least one channel or the at least one of the plurality of channels in the stator core are oriented in the axial direction and/or in the radial direction and/or in the circumferential direction.

11. The bearing assembly according to claim 8, wherein the at least one channel or the plurality of channels are oriented in the axial direction or the at least one channel or the plurality of channels are oriented in the radial direction.

12. The bearing assembly according to claim 1, wherein the one of the bearings is pressed into the opening of the first outer partial stator core and the second one of the bearings is pressed into the opening of the second outer partial stator core.

13. The bearing assembly according to claim 1, wherein the first and second outer partial stator cores have a substantially same design, and wherein the central partial stator core has a different design therefrom.

14. The bearing assembly according to claim 1, wherein the motor shaft is inserted, or pressed into the bearings.

15. The bearing assembly according to claim 1, wherein a first cover is provided, which at least partially covers the one of the bearings and the first outer partial stator core.

16. The bearing assembly according to claim 15, wherein a second cover is provided, which at least partially covers the second one of the bearings and the second outer partial stator core.

17. The bearing assembly according to claim 16, wherein at least one radial shaft sealing ring is provided, which is disposed in a recess of the first cover and/or the second cover and is provided in a sealing manner between the first cover and/or the second cover and the motor shaft.

18. The bearing assembly according to claim 16, wherein the stator core has a first circumferential wall disposed radially outside the continuous opening, and wherein the first cover or the second cover overlaps the first circumferential wall.

19. The bearing assembly according to claim 18, wherein the stator core has a second circumferential wall disposed radially outside the first circumferential wall and wherein the first cover and/or the second cover engages with at least one opening or with multiple openings, which are disposed radially outside the first circumferential wall and/or between the first circumferential wall and the second circumferential wall.

20. The bearing assembly according to claim 16, wherein the first cover and/or the second cover is or are connected to the stator core in a form-fitting manner.

21. The bearing assembly according to claim 20, wherein a fastener is provided on the first cover and/or on the second cover, with the aid of which the first cover or the second cover is connected to the stator core in the form-fitting manner.

22. The bearing assembly according to claim 16, wherein at least one fastener is provided on one of the first cover or the second cover, with the aid of which the bearing assembly is adapted to be fastened to an external component.

23. The bearing assembly according to claim 16, wherein at least one fastener is provided on one of the first cover or the second cover, which forms a receiving chamber for a control unit for an electric motor.

24. An electric motor comprising a stator and a rotor, the stator forming a bearing assembly according to claim 1.

25. A bearing assembly for a motor shaft of an electric motor, the bearing assembly comprising:
 a stator formed from a stator core made up of a plurality of stator elements that are stacked one on top of the other, the stator core having a first outer partial stator core, a second outer partial stator core and a central partial stator core, the central partial stator core being disposed between the first and second outer partial stator cores; and
 a continuous opening disposed in the first, second and central partial stator cores, in which bearings for supporting the motor shaft are provided and in which the motor shaft is accommodated,
 wherein the continuous opening includes an opening in the first outer partial stator core, an opening in the second outer partial stator core and an opening in the central partial stator core,
 wherein a diameter of the opening of the central partial stator core is smaller than a diameter of each of the opening of the first outer partial stator core and the second outer partial stator core, so that a diameter transition from the central partial stator core to the first outer partial stator core forms a first axial stop for one of the bearings and a diameter transition from the central partial stator core to the second outer partial stator core forms a second axial stop for a second one of the bearings, the one of the bearings being disposed in the opening of the first outer partial stator core and the second one of the bearings being disposed in the opening of the second outer partial stator core, and
 wherein the one of the bearings directly abuts the first outer partial stator core and the first axial stop and wherein the second one of the bearings directly abuts the second outer partial stator core and the second axial stop.

* * * * *